UNITED STATES PATENT OFFICE.

MARIA DOROTHEA PETERSEN, OF OBERJERSDAL, GERMANY.

LAUNDRY STARCH.

SPECIFICATION forming part of Letters Patent No. 649,210, dated May 8, 1900.

Application filed July 6, 1899. Serial No. 722,965. (No specimens.)

*To all whom it may concern:*

Be it known that I, MARIA DOROTHEA PETERSEN, a subject of the King of Prussia, German Emperor, residing at Oberjersdal, North Schleswig, in the Kingdom of Prussia, Germany, have invented certain new and useful Improvements in the Manufacture of Laundry Starch, (for which I have applied for patents in England, No. 11,416, dated June 1, 1899; in Austria, dated June 5, 1899; in Hungary, No. 8,313, dated June 2, 1899; in Germany, dated May 25, 1899, and in Denmark, No. 584, dated May 30, 1899,) of which the following is a specification.

Of the ordinary kinds of starch employed for starching and getting up clothes, linen, and textile fabrics generally rice-starch is most usually employed, because it has very great advantages as compared with the other ordinary kinds of starch, such as maize-starch, wheat-starch, and especially potato-starch. This is doubtless due to the fineness of the particles of rice-starch, which with the aid of a microscope can be readily seen to be the finest of the ordinary starch-flours; but even rice-starch has great drawbacks when used for starching clothes, &c., and dark-colored materials (dark blue, dark brown, or black, &c.) cannot be starched with the ordinary starches procurable in the market without becoming gray and spotted.

Now the present invention has for its object to obviate these drawbacks. This is effected by manufacturing a laundry starch of peculiar composition, which has very great advantages as compared with the laundry starches heretofore employed.

This improved laundry starch is made by mixing together sago-flour, (which is the finest of all starch-flours,) dextrine, and common salt in suitable proportions. All these materials are well mixed together in the dry state. Then the mixture is first stirred with a little cold water, and finally stirred up with some boiling water, which is poured slowly into it. All boiling of the mixture must, however, be avoided. The following proportions of the ingredients have been found suitable: five parts, by weight, of sago-flour; two parts, by weight, of common salt; and one part, by weight, of dextrine. These proportions may, however, be varied.

By using laundry starch prepared in the manner above described for starching linen, &c., all grayness and spotted appearance is avoided and the linen acquires a much more lustrous gloss than could be produced with the laundry starch hitherto employed.

What I claim, and desire to secure by Letters Patent of the United States, is—

Starch for linen and the like consisting of sago in the form of meal, salt (common salt) and dextrine, substantially as set forth.

In testimony whereof I have hereunto set my hand in the presence of two witnesses.

MARIA DOROTHEA PETERSEN.

Witnesses:
  HEINRICH PETERSEN,
  E. H. L. MUMMENHOFF.